May 2, 1961  J. A. ENRIGHT  2,982,847
ILLUMINATED INDICATING INSTRUMENT
Filed Oct. 30, 1958  2 Sheets-Sheet 1

INVENTOR.
John A. Enright
BY Richard E. Hosley

May 2, 1961  J. A. ENRIGHT  2,982,847
ILLUMINATED INDICATING INSTRUMENT
Filed Oct. 30, 1958  2 Sheets-Sheet 2

INVENTOR.
John A. Enright
BY Richard E. Horley a# United States Patent Office 2,982,847
Patented May 2, 1961

2,982,847

ILLUMINATED INDICATING INSTRUMENT

John A. Enright, Melrose, Mass., assignor to General Electric Company, a corporation of New York Filed Oct. 30, 1958, Ser. No. 770,725

7 Claims. (Cl. 240—2.1)

This invention relates to illuminating means for indicating instruments and, in particular, to an integral lighting system adapted for installation within an instrument housing.

Indicating instruments such as aircraft instruments are frequently installed in poorly lighted locations or at such a distance from the observer that it is difficult to read the position of the instrument indicator. Such difficulty usually cannot be satisfactorily solved by the use of exteriorly located lamps lighting the dial, as the glare from such lamps and the reflection from the cover glass of the instrument seriously interfere with the vision of the observer. Attempts have heretofore been made to illuminate the dial by the use of lamps placed within the instrument housing. Such prior arrangements, however, whether devised for direct or indirect lighting, have not proven entirely satisfactory because of the irregular and spotty illumination furnished, the insufficiency of the light furnished, the increase in instrument housing size necessary to accommodate the lighting system, and the increased cost and complexity of the instrument.

A principal object of this invention is to provide means within an instrument for uniformly illuminating the indicating portions of the instrument with the source of illumination being behind the transparent front panel of the instrument.

It is another object of this invention to provide an improved integral lighting system for an instrument which efficiently utilizes the light to illuminate the indicating portions at the desired light level and which at the same time does not materially add to the size of the instrument.

It is a further object of this invention to provide an improved integral lighting arrangement for an instrument which is simplified in construction and which provides adjustment means to compensate for variations in manufacturing tolerances of the system itself and also of replacement lamps.

It is a further object of this invention to provide an instrument lighting arrangement which provides for maximum reliability and in which the light source or sources are easily accessible for renewal and replacement.

Further objects and advantages of this invention will become apparent as the following description proceeds, and the features of novelty which characterize this invention will be pointed out with particularity in the claims annexed to and forming a part of this specification.

In accordance with one form of this invention, a lamp holder containing a pair of lamps with their filaments approaching one another is provided with a light exit slot parallel to the axis of the lamps to provide a beam of light directed at the instrument scale in a floodlighting manner. The holder is positioned below and in front of the scale and may be rotated so as to control the intensity of illumination of the scale by varying the angle the emitted light makes with the scale. The light exit slot may be provided with a filter to produce the desired color of light, and one edge is arcuately shaped such that the slot is wider at the ends. A reflector is utilized on the opposite side of the scale to reflect light back onto the scale.

For a better understanding of this invention, reference may be had to the accompanying drawings, in which.

Figure 1:
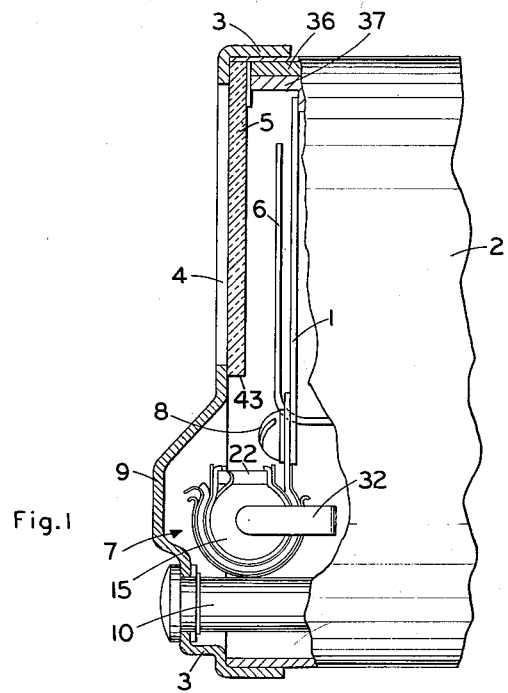
Figure 1 is a side elevation, partly in section, of an indicating instrument equipped with a lighting system in accordance with this invention.

Referring to Figure 1, there is shown an electric instrument having a scale 1, which is to be illuminated, disposed within the instrument housing 2 and enclosed at one end by a front cover 3 which includes a viewing aperture 4 and associated transparent viewing panel 5. A movable pointer 6 is associated with scale 1 and moves in response to the variable being measured or indicated, although scale 1 may conveniently be provided with digital type of readout. The instrument described thus far is typical of many well known in the art, and the details of construction have been omitted in the interest of brevity and clarity in showing the present invention.

Disposed below and in front of the scale 1 is the lamp housing with its associated electrical and mechanical connections, shown generally as 7, which may be conveniently removably secured to the scale 1 by suitable fastening means such as screws 8. A slight protrusion 9 of front cover 3 provides all the space necessary to enclose the lamp housing 7 within the instrument. An instrument zero-set means 10 passes through the front cover 3 below the lamp housing 7 to the interior of the instrument housing 2.

Figure 4:
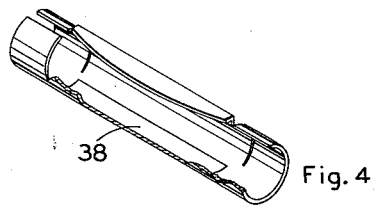
Figure 4 illustrates the contour of the lamp housing light exit slot and its position relative to the interior reflecting stripe.
Figures 2, 3:
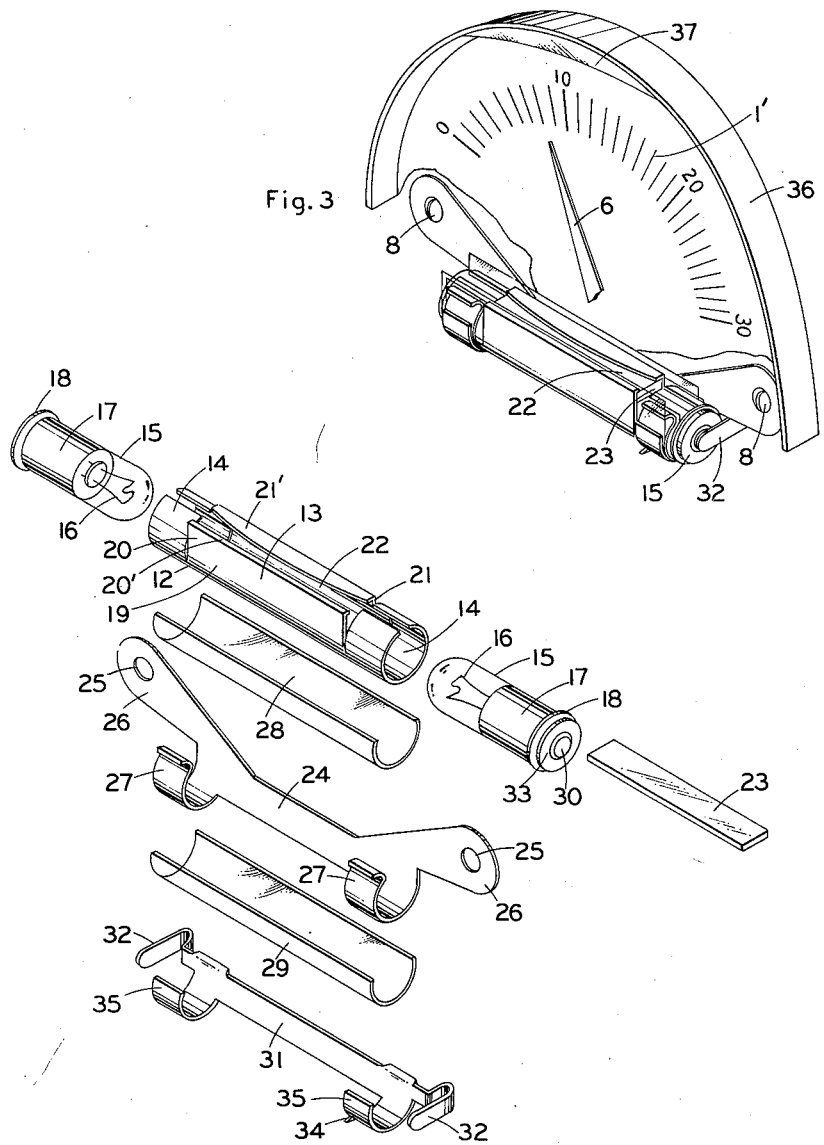
Figure 2 is an expanded perspective view of the lamps and their associated holder, mounting bracket, and contact arrangement.
Figure 3 is a perspective view illustrating the placement of the lighting system relative to the instrument scale, with portions of the instrument omitted for clarity.

The lamp holder 12 is conveniently formed of Phosphor bronze 8 mils thick to provide the desired resiliency and electrical qualities in the shape shown in Figure 2. The lamp holder 12 comprises a central light forming region 13 surrounded by a pair of lamp contacting end regions 14. The lamps 15 may be of any suitable type such as the General Electric Type No. 328 Aircraft Panel Lamp, dissipating approximately one watt at six volts. The lamps 15 are inserted into the lamp holder with the filaments or light emitting elements 16 toward the central light forming region 13. The resiliency of the lamp contacting end regions 14 of the lamp holder 12 is sufficient to provide electrical contact with the bases 17 of the lamps 15. In order to reduce the contact resistance, the contacting ends 14 may be silverplated. The lamps 15 are inserted until stopped by the mating of the ridges 18 of the lamps 15 with the outer edges of contacting ends 14. The central light forming region 13 of lamp holder 12 comprises a substantially cylindrical lower portion 19 concentrically surrounding the lamps 15 and a pair of parallel extensions 20 and 21 in the region beneath the scale 1, forming a light exit slot 22. The edges 20' and 21' extend at right angles to the extensions 20 and 21, as best shown in Figures 2 and 4. Edge 20' forms a substantially rectangular overlapping edge, while edge 21' is curved such that the light exit slot 22 is wider at the ends with the width decreasing toward the central region. The edges 20' and 21' are sufficiently above the contacting ends 14 so that rectangular filter 23 may be slid in to be retained in place between the edges and the tops of the lamps 15. The filter 23 may be conveniently formed of a thermosetting plastic, surface dyed so as to conform to the color identified by the National Bureau of Standards red filter No. 3215, The lamp holder 12 with its associated lamps 15 and filter 23 is supported within the instrument housing by lamp mounting bracket 24 which in turn is supported by scale 1 by screws 8 passing through the apertures 25 in ears 26. The mounting bracket may be conveniently formed of Phosphor bronze 16 mils thick, and spring clips 27 will be sufficiently resilient to firmly support the lamp holder when it is snapped into place with the clips surrounding the holder. The lamp holder 12 is electrically insulated from the lamp mounting bracket 24 by a thin sheet of plastic 28 such as that sold by the E. I. du Pont Company under the trademark Mylar. A second sheet of plastic insulation 29 is then wrapped around the lamp mounting bracket 24. It has been found convenient to coat the inside of the second insulating sheet 29 with an adhesive so that the two insulating sheets will adhere together in the region between the spring clips 27. Electrical contact is made to the end terminals 30 of the lamps 15 by the lamp contact element 31 which surrounds the lower portion of lamp mounting bracket 24 and is insulated from it by the second sheet of plastic insulation 29. Tab portions 32 are preferably silverplated and span the insulation 29 and the band of insulation 33 of lamps 15 to contact the end terminals 30. The external leads (not shown) to the lamp assembly connect the lamps in parallel, with one lead being connected to both end terminals 30 via connector 34 and tab portions 32 of contact element 31 and the other lead being connected to both bases 17 via lamp holder 12 and contacting ends 14.

As best shown in Figure 1, the lamp housing 7 is positioned below and in front of the scale 1 with the light exit slot 22 directing a light beam upward toward the scale 1 and the associated pointer 6 with the light making a small angle with transparent viewing panel 5. The light is reflected back onto the scale 1 by the panel 5 and does not pass through to directly reach the eyes of the person reading the instrument. To prevent light rays from passing into the transparent viewing panel 5 through the lower edge, the lower edge 43 is painted black.

Light passing upward beyond the scale 1 is reflected back onto the scale by an arcuate reflector 36 surrounding the sale 1 opposite the lamp housing 7 and positioned in the region between the scale and the transparent panel 5, as best shown by Figure 3. In order to obtain more uniform illumination of the scale 1, a reflecting member 37 is provided at the upper central portion of the reflector 36 so that the inner reflecting surface of member 37 is equidistant from the center of the moving system of the instrument or the pivot of pointer 6. Since the scale markings or indicia 1' are similarly disposed, the inner surface of the reflecting member 37 is equidistant from the central region of the scale markings.

The reflecting member 37 is painted white along its inner surface, whereas the remainder of the reflector 36 may conveniently be a glossy black to provide less light reflection than that provided by reflecting member 37. Reflecting member 37 is designed to reflect additional light onto the upper central portion of the scale, since this region is the most remote from the lamp housing 7 and normally would receive the least amount of light. The inside of the instrument housing is painted a dull black to absorb any white light which might escape from the lamp holder 12.

In order to obtain the desirable light beam from the slot 22, the interior of the central light forming region 13 is painted black, with the exception of the narrow band of light reflecting white paint positioned diametrically opposite to the slot 22 as best shown in Figure 4 and as identified by the numeral 38.

The lamp holder 12 is dimensioned such that the filaments 16 of the lamps 15 approach one another when positioned in the holder. The lamps are positioned relative to the scale such that they each effectively illuminate the entire scale. If one of the lamps should burn out, the scale will still be illuminated but at a reduced level of illumination. Since the scale illumination of the lamps 15 is additive, it is possible to use lamps which vary in brightness and still obtain uniform scale illumination. Since manufacturing tolerances including the exact placement of the filament and the light output of standard lamps vary considerably, it has been common practice in many prior art illumination arrangements to select lamps exhibiting the desired characteristics. However, the system of the present invention includes sufficient adjustability that lamps may be used without preselection and the lighting system adjusted to provide the desired level of illumination and also equal illumination of the scale. The level of illumination of the scale 1 may be varied by the simple expediency of rotating the lamp holder 12 and thus rotating the slot 22 and varying the angle the emitted light makes with the scale 1. Also, since apertures 25 may be fabricated larger than the diameter of the screws 8, a certain amount of motion of the lamp holder 12 may be accomplished in a plane parallel to that of the scale 1 to vary the distance of the lamp holder from the scale.

Various features of the invention cooperate to provide the desired uniform scale illumination. The lower central region of the scale contiguous to the lamp filaments 16 is prevented from receiving excess light through the shaping of the light exit slot 22. Since the slot 22 is narrowest in this region, less light is emitted than at the ends of the slot. Uniform lighting of the upper central region of the scale is provided by the reflecting member 37, even though this region is the furthest removed from the lamp holder 12. The over-all level of illumination is increased through the use of the reflected light from the transparent viewing panel 5 because of the shallow angle the incident light makes with it and also from the shiny black inner surfaces of the reflector 36 not covered by the light reflecting member 37. A fine adjustment on the brightness of the pointer 6 may be made by adjusting the angle the pointer makes with the scale 1.

It is thus apparent that an integral lighting system for indicating instruments has been provided in which the intensity of the illumination may be controlled and in which the scale illumination will be uniform.

Therefore, while a particular embodiment of the subject invention has been shown and described herein, it is in the nature of description rather than limitation, and it will occur to those skilled in the art that various changes, modifications, and combinations may be made within the provisions of the appended claims and without departing either in spirit or scope from the invention in its broader aspects.

What I claim as new and desire to secure by Letters Patent of the United States is:

1. An indicating instrument comprising: a scale within a housing, a lighting system positioned within the housing and comprising: a rotatably mounted lamp holder within the housing and adjacent one side of the scale, a pair of lamps with their light emitting elements positioned toward one another within said holder, a light defining slot in and parallel to the axis of said holder to direct a beam of light toward the scale, an arcuate reflector positioned on the opposite side of said scale to reflect light back onto the scale, said lamps and said slot being positioned so each lamp respectively illuminates substantially all of the scale, said slot in the operative position being positioned such that light passes therethrough directly from said lamps to said scale, and means to control the illumination of said scale including a rotatable mounting for said holder for rotation of said holder, slot, and lamps about the axis of said lamps, said rotation adjusting the angle the light from said defining slot makes with said scale.

2. An indicating instrument comprising: a scale within a housing, a lighting system positioned within the housing and comprising: a rotatably mounted lamp holder within the housing and adjacent one side of the scale, a pair of lamps with their light emitting elements positioned toward one another within said holder, a light defining slot in said holder substantially parallel to the axis of said lamps to direct a beam of light directly toward the scale, said slot being arcuate in shape along at least one edge thereof with the ends wider than the central region thereof, an arcuate reflector positioned on the opposite side of said scale to reflect light back onto the scale, said lamps and said slot being positioned so each lamp respectively illuminates substantially all of the scale, and a mounting for said holder to enable rotation of said holder and slot about the axis of said lamps, said rotation adjusting the angle the light from said defining slot makes with said scale.

3. An indicating instrument comprising: a scale within a housing, a lighting system positioned within the housing and comprising: a lamp holder mounted within the housing adjacent one side of the scale, a pair of lamps with their light emitting elements positioned toward one another within said holder, a light defining slot in said holder substantially parallel to the axis of said lamps to direct a beam of light directly toward the scale, said slot being wider at the ends than the central region thereof, and an arcuate reflector positioned on the opposite side of said scale to reflect light back onto the scale, at least a portion of said reflector located remote from said lamps and being of a configuration so as to be equidistant from the indicia of said scale adjacent thereto, said slot being positioned so each lamp respectively illuminates substantially all of the scale.

4. An indicating instrument comprising: a scale within a housing, a lighting system positioned within the housing and comprising: a rotatably mounted lamp holder within the housing and adjacent one side of the scale, a pair of lamps with their light emitting elements positioned toward one another within said holder, a light defining slot in said holder substantially parallel to the axis of said lamps to direct a beam of light toward the scale, an arcuate reflector positioned on the opposite side of said scale to reflect light back onto the scale, said lamps and said slot being positioned so each lamp respectively illuminates substantially all of the scale, and means to control the illumination of said scale including a mounting for said holder to position said holder in front and to the side of the scale and enable rotation of said holder and slot about the axis of said lamps, said rotation adjusting the angle the light from said defining slot makes with said scale.

5. An indicating instrument comprising: a scale within a housing and a transparent panel in said housing to view the scale, a lighting system positioned within the housing and comprising: a rotatably mounted lamp holder within the housing and adjacent one side of the scale, a pair of lamps with their light emitting elements positioned toward one another within said holder, a light defining slot in said holder substantially parallel to the axis of said lamps to direct a beam of light toward the scale, an arcuate reflector positioned on the opposite side of said scale to reflect light back onto the scale, said lamps and said slot being positioned so each lamp respectively illuminates substantially all of the scale, and means to control the illumination of said scale including a mounting for said holder to position said holder in front and to the side of the scale and enable rotation of said holder and slot about the axis of said lamps, said holder position being removed from the transparent viewing panel so that light from said lamps makes a shallow angle therewith and is reflected back into said housing rather than passing through the panel, said rotation of said holder adjusting the angle the light from said defining slot makes with said scale.

6. An indicating instrument comprising: a scale within a housing and a transparent panel in said housing to view the scale, a lighting system positioned within the housing and comprising: a rotatably mounted lamp holder within the housing and adjacent one side of the scale, a pair of lamps with their light emitting elements positioned toward one another within said holder, a light defining slot in said holder substantially parallel to the axis of said lamps to direct a beam of light toward the scale, said slot being wider at the ends than in the central region thereof, an arcuate reflector positioned on the opposite side of said scale to reflect light back onto the scale, said lamps and said slot being positioned so each lamp respectively illuminates substantially all of the scale, and a mounting for said holder to position said holder in front and to the side of the scale and enable rotation of said holder and slot about the axis of said lamps, said holder position being removed from the transparent viewing panel so that light from said lamps makes a shallow angle therewith and is reflected back into said housing rather than passing through the panel, said rotation adjusting the angle the light from said defining slot makes with said scale, the edge of said panel closest to said lamp holder being nontransparent to light.

7. An indicating instrument comprising: a scale within a housing and a transparent panel in said housing to view the scale, a lighting system positioned within the housing and comprising: a rotatably mounted lamp holder within the housing and adjacent one side of the scale, a pair of lamps with their light emitting elements positioned toward one another within said holder, a light defining slot in said holder substantially parallel to the axis of said lamps to direct a beam of light toward the scale, said slot being wider at the ends than in the central region thereof and covered by a filter retained thereby, an arcuate reflector positioned on the opposite side of said scale to reflect light back onto the scale, said lamps and said slot being positioned so each lamp respectively illuminates substantially all of the scale, and a mounting for said holder to position said holder in front and to the side of the scale and enable rotation of said holder, slot, and lamps about the axis of said lamps, said holder position being removed from the transparent viewing panel to that light from said lamps makes a shallow angle therewith and is reflected back into said housing rather than passing through the panel, said rotation adjusting the angle the light from said defining slot makes with said scale, the edge of said panel closest to said lamp holder being nontransparent to light.

References Cited in the file of this patent
UNITED STATES PATENTS

| | | |
|---|---|---|
| 1,786,768 | Moorehouse | Dec. 30, 1930 |
| 2,262,920 | Carbonara | Nov. 18, 1941 |
| 2,347,672 | Dircksen et al. | May 2, 1944 |
| 2,673,924 | Roper et al. | Mar. 30, 1954 |
| 2,710,910 | Grimes | June 14, 1955 |
| 2,782,294 | Tinich | Feb. 19, 1957 |
| 2,875,320 | Campbell | Feb. 24, 1959 |